United States Patent
Hsu et al.

(10) Patent No.: US 9,892,226 B2
(45) Date of Patent: Feb. 13, 2018

(54) METHODS FOR PROVIDING MACRO PLACEMENT OF IC

(71) Applicant: MediaTek Inc., Hsin-Chu (TW)

(72) Inventors: Chin-Hsiung Hsu, Taoyuan (TW); Chun-Chih Yang, New Taipei (TW); Shih-Ying Liu, Taipei (TW); Che-Jung Lou, Zhubei (TW); Chao-Neng Huang, Hsinchu (TW); Chi-Yuan Liu, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/147,152

(22) Filed: May 5, 2016

(65) Prior Publication Data

US 2016/0335386 A1 Nov. 17, 2016

Related U.S. Application Data

(60) Provisional application No. 62/214,509, filed on Sep. 4, 2015, provisional application No. 62/159,468, filed on May 11, 2015.

(51) Int. Cl.
*G06F 17/50* (2006.01)

(52) U.S. Cl.
CPC ...... *G06F 17/5072* (2013.01); *G06F 2217/12* (2013.01)

(58) Field of Classification Search
CPC ............. G06F 17/5045; G06F 17/5068; G06F 17/5072; G06F 17/5081; G06F 2217/06; G06F 2217/12
USPC .......................................... 716/110, 119, 132
See application file for complete search history.

(56) References Cited

U.S. PATENT DOCUMENTS

| | | | |
|---|---|---|---|
| 2007/0157146 A1* | 7/2007 | Chen | G06F 17/5072 257/798 |
| 2012/0036491 A1* | 2/2012 | Ramji | G06F 17/5072 716/122 |

\* cited by examiner

*Primary Examiner* — Paul Dinh
(74) *Attorney, Agent, or Firm* — McClure, Qualey & Rodack, LLP

(57) ABSTRACT

A method for providing a macro placement of an integrated circuit is provided. An initial placement of the integrated circuit is obtained, wherein the initial placement includes a plurality of first macro blocks. The first macro blocks are divided into a plurality of groups according to the hierarchy of the integrated circuit. A value of layout area is obtained for each of the groups according to macro areas of the first macro blocks. A plurality of candidate placements are obtained for each of the groups according to the value of placement area corresponding to the group, wherein the candidate placement includes the first macro blocks corresponding to the group. A first macro placement is obtained according to a specific placement o selecting from the candidate placements for each of the groups.

20 Claims, 14 Drawing Sheets

METHODS FOR PROVIDING MACRO PLACEMENT OF IC

CROSS REFERENCE TO RELATED APPLICATIONS

This Application claims priority of U.S. Provisional Application No. 62/159,468, filed on May 11, 2015, and U.S. Provisional Application No. 62/214,509, filed on Sep. 4, 2015, the entirety of which is incorporated by reference herein.

BACKGROUND OF THE INVENTION

Field of the Invention

The invention relates to a method for providing a macro placement of an integrated circuit (IC), and more particularly to a method for providing a macro placement of an IC with smoothness and dynamic macro channel.

Description of the Related Art

In recent years, the developing process of integrated circuits (ICs) such as super larger scale integrated circuits (LSIs) generally utilizes computer assisted design (CAD). According to such a developing process based on CAD, abstract circuit data, which corresponds to functions of an integrated circuit to be developed, is defined by using a so-called hardware description language (HDL), and the defined circuit is used to form a concrete circuit structure to be mounted on a chip.

Before the IC chips are manufactured (or implemented), the placements, the floor plans, and the layout areas of the IC chips are first considered so as to determine a die size for each IC chip. In general, the die size will affect the manufacturing cost of the IC chip. Therefore, it is desirable to optimize the floor plan of an IC chip for minimizing the layout area of the IC chip.

BRIEF SUMMARY OF THE INVENTION

Methods for providing a macro placement of an integrated circuit and a non-transitory computer-readable storage medium storing instructions are provided. An embodiment of a method for providing a macro placement of an integrated circuit is provided. An initial placement of the integrated circuit is obtained, wherein the initial placement comprises a plurality of first macro blocks. The first macro blocks are divided into a plurality of groups according to the hierarchy of the integrated circuit. A value of placement area is obtained for each of the groups according to macro areas of the first macro blocks. A plurality of candidate placements are obtained for each of the groups according to the value of placement area corresponding to the group, wherein the candidate placement comprises the first macro blocks corresponding to the group. A first macro placement is obtained according to a specific placement selecting from the candidate placements for each of the groups.

Furthermore, another embodiment of a method for providing a macro placement of an integrated circuit is provided. An initial placement of the integrated circuit is obtained, wherein the initial placement comprises a plurality of first macro blocks. The first macro blocks are divided into a plurality of groups according to the hierarchy of the integrated circuit. A value of placement area is obtained for each of the groups according to macro areas of the first macro blocks. A plurality of candidate placements are obtained for each of the groups according to the value of placement area corresponding to the group, wherein the candidate placement comprises the first macro blocks corresponding to the group, and each of the candidate placements comprises a rectangle having an individual length and an individual width. A specific placement is selected from candidate placements for each of the groups, and channel widths between the first macro blocks are adjusted in the specific placements. A first macro placement is obtained according to the specific placements.

Moreover, an embodiment of a non-transitory computer-readable storage medium storing instructions that, when executed by a computer, cause the computer to perform a method for providing a macro placement of an integrated circuit. An initial placement of the integrated circuit is obtained, wherein the initial placement comprises a plurality of first macro blocks. The first macro blocks are divided into a plurality of groups according to the hierarchy of the integrated circuit. A value of placement area is obtained for each of the groups according to macro areas of the first macro blocks. A plurality of candidate placements are obtained for each of the groups according to the value of placement area corresponding to the group, wherein the candidate placement comprises the first macro blocks corresponding to the group. A first macro placement is obtained according to a specific placement selecting from the candidate placements for each of the groups.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
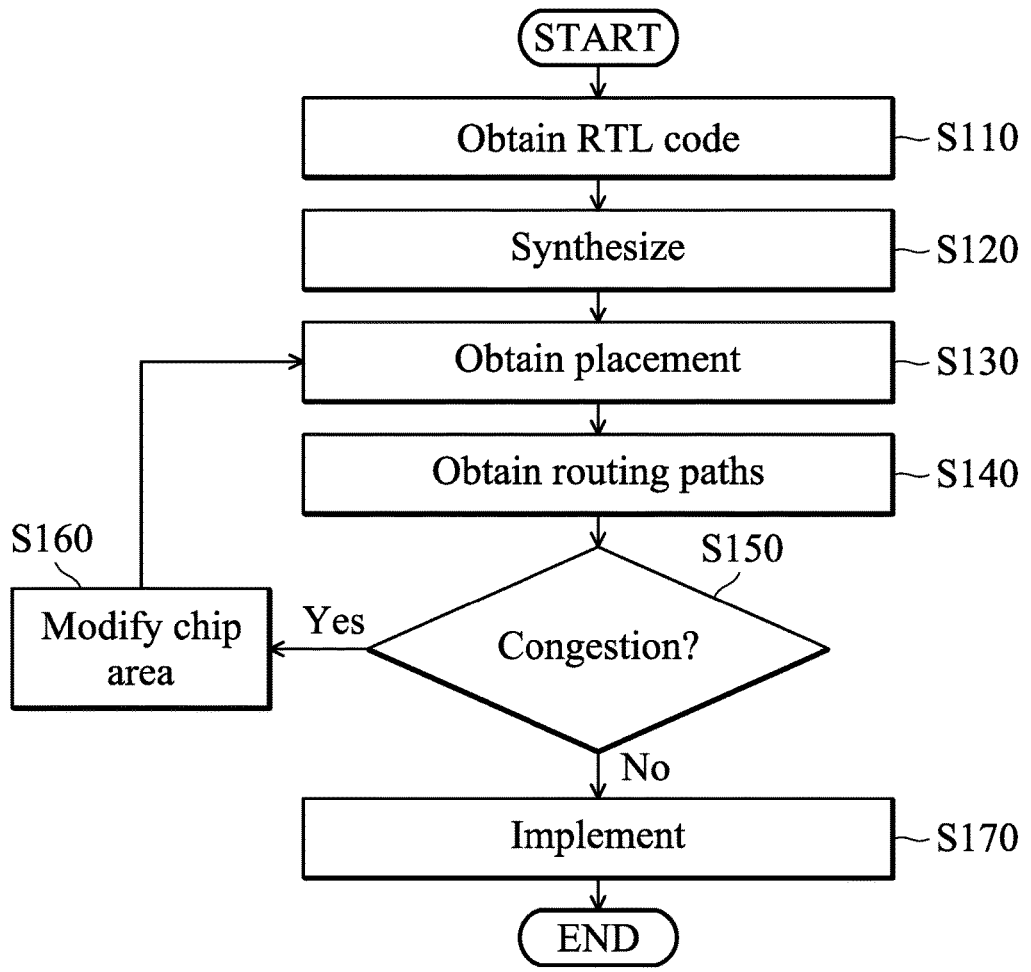
FIG. 1 shows a flow chart illustrating a typical hierarchical design process of an integrated circuit (IC)

FIG. 1 shows a flow chart illustrating a typical hierarchical design process of an integrated circuit (IC). First, in step S110, a register-transfer-level (RTL) code describing the function performed by the IC is obtained. Next, in step S120, the RTL code is synthesized to generate gates for the IC. In general, the IC comprises a plurality of macro blocks, and each macro block provides a significant function for the IC, such as a specific processor (e.g. an application processor, a video processor, an audio processor, or a controller), a memory (e.g. a SRAM module) and so on. Furthermore, each macro block has a corresponding RTL code, and then the RTL codes of each macro block are synthesized to generate the gates of the macro block. Next, in step S130, according to a macro placement comprising a plurality of placements of the macro blocks, a whole chip placement procedure is performed to generate a placement of the gates within a chip area of the IC. For example, assuming that the IC comprises N macro blocks, N placements of the N macro blocks will have previously been generated according to the RTL codes of the macro blocks. Thus, according to the N placements of the N macro blocks and the gates that do not belong to the N macro blocks, the whole chip placement procedure is performed and a whole chip placement is obtained. Next, the routing paths are obtained according to the whole chip placement (step S140), and then it is checked whether there is any congestion in the whole chip placement according to the routing paths (step S150). If there is no congestion, the IC is implemented according to the whole chip placement and routing paths (step S170). If there is congestion, the chip area of the IC must be modified to handle the congestion (step S160), and then the automatic place and route (APR) procedure is performed again (steps S130 and S140) so as to generate a new whole chip placement of the gates with the corresponding routing paths within the increased chip area of the IC.

Figure 2:
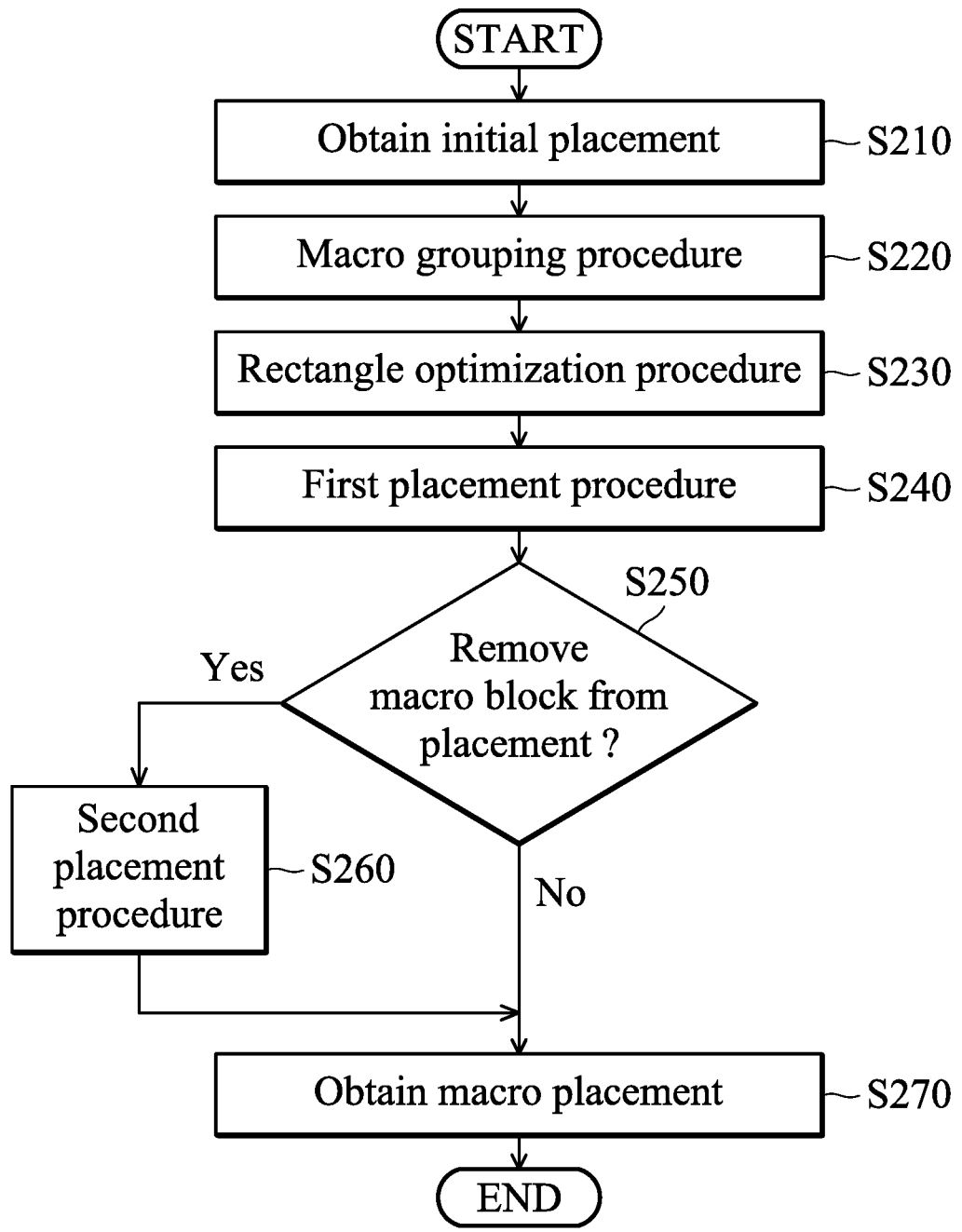
FIG. 2 shows a method for providing a macro placement of an IC according to an embodiment of the invention, wherein the method of FIG. 2 is performed by a computer capable of operating an electronic design automation (EDA) tool.

FIG. 2 shows a method for providing a macro placement of an IC according to an embodiment of the invention, wherein the method of FIG. 2 is performed by a computer capable of operating an electronic design automation (EDA) tool. First, in step S210, a processor of the computer obtains the initial placement of the IC, and the initial placement can be displayed in a graphical user interface (GUI). The initial placement comprises a plurality of macro blocks MB of the IC that are placed in a layout area of the IC. Next, in step S220, the processor performs a macro grouping procedure according to the hierarchy information of the macro blocks MB in the IC, so as to divide the macro blocks MB of the IC into a plurality of groups MG For example, the macro blocks MB corresponding to the same hierarchy path in the IC will be grouped/divided into the same group MG Next, in step S230, the processor performs a rectangle optimization procedure on each group MG, so as to obtain a plurality of candidate placements CP for each group MG Next, in step S240, the processor performs a first placement procedure for the groups MG, so as to select a placement from the candidate placements CP for each group MG, and to place the selected placements of the groups MG in the layout area of the IC according to a specific rule, thereby obtaining an intermediate placement for the groups MG of the IC. Next, in step S250, it is determined whether any macro block MB is removed from the corresponding placement of the group MG in the intermediate placement. If no macro block MB is removed from the corresponding placement of the group MG, a macro placement is obtained according to the first placement for the IC (step S270). Conversely, if the macro blocks MB are removed from the corresponding placements of the groups MG, the processor performs a second placement procedure according to the intermediate placement, so as to place the removed macro blocks MB into the intermediate placement (step S260), thereby obtaining a macro placement for the IC (step S270). As described above, a whole chip APR is performed after obtaining the macro placement of all the macro blocks of an IC, e.g. steps S130 and S140 of FIG. 1. In the embodiment, by placing all the macros within a layout area of the IC, the macro placement of all the macro blocks can provide an optimum blank space between the macro blocks to optimize routability and satisfy timing constraints for the IC. Thus, cost of a place and route (APR) procedure (e.g. steps S130 and S140 of FIG. 1) can be decreased. For example, manpower cost and execution time can be decreasing in the APR procedure.

Figure 3A:
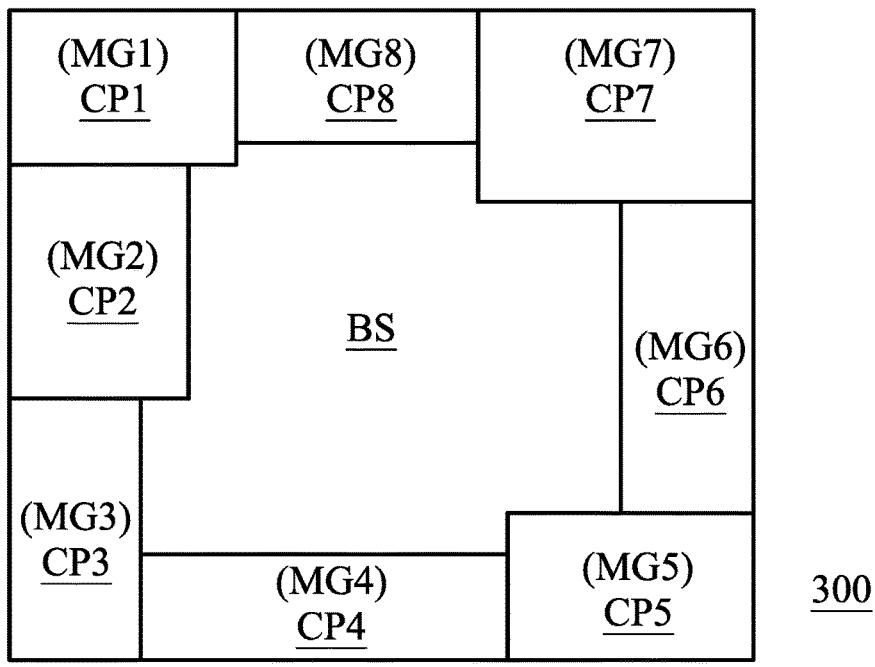
FIG. 3A shows an example illustrating an intermediate placement of an IC.
Figure 3B:
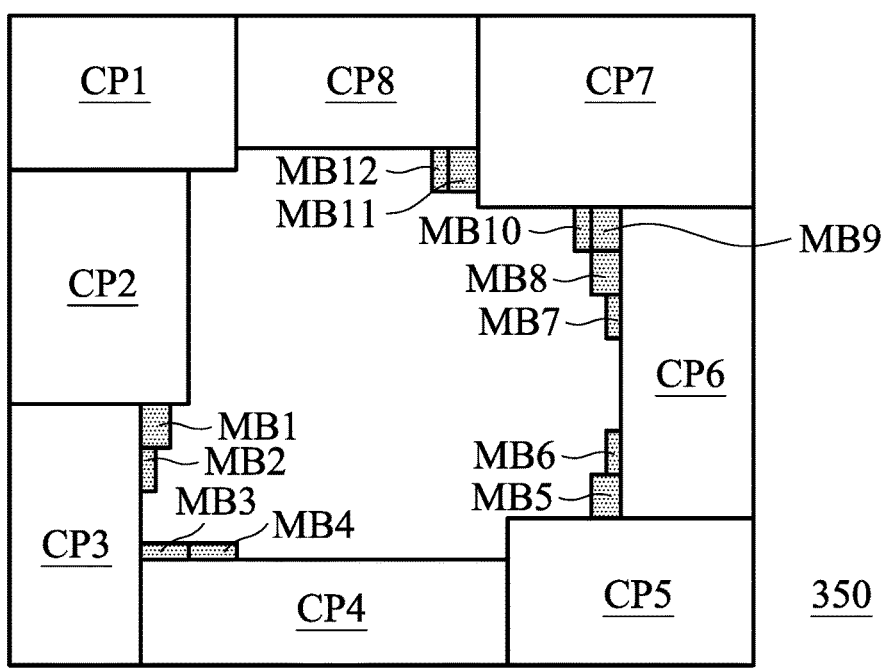
FIG. 3B shows an example illustrating a macro placement of the IC of FIG. 3A.

FIG. 3A shows an example illustrating a macro placement 300 of an IC, and FIG. 3B shows an example illustrating a macro placement 350 of the IC, wherein the IC comprises a plurality of groups MG1-MG8. The macro placement 300 of FIG. 3A is obtained via the first placement procedure (step S240 of FIG. 2), and the macro placement 350 of FIG. 3B is obtained via the second placement procedure (step S270 of FIG. 2). In the macro placement 300 of FIG. 3A and the macro placement 350 of FIG. 3B, a plurality of placements CP1-CP8 are the optimal placements for groups MG1-MG8, respectively. For example, the placement CP1 is the optimal placement selected from the candidate placements CP of the group MG1, the placement CP2 is the optimal placement selected from the candidate placements CP of the group MG2, and so on. In the embodiment, the placements CP1-CP8 are placed around a layout area of the IC according to a specific rule. For example, the placements CP1-CP8 are arranged in a surrounding portion of the layout area of the IC. Furthermore, a blank space BS between the placements CP1-CP8 is used to place the standard cells or other macro blocks MB1-MB12 of FIG. 3B. In some embodiments, the macro blocks MB1-MB12 are the macro blocks that are divided into groups MG1-MG8 but are not disposed in the placements CP1-CP8, i.e. the macro blocks removed from the groups MG1-MG8. The details of the specific rule and the selection of the optimal placement of each group will be described below.

Figure 4:
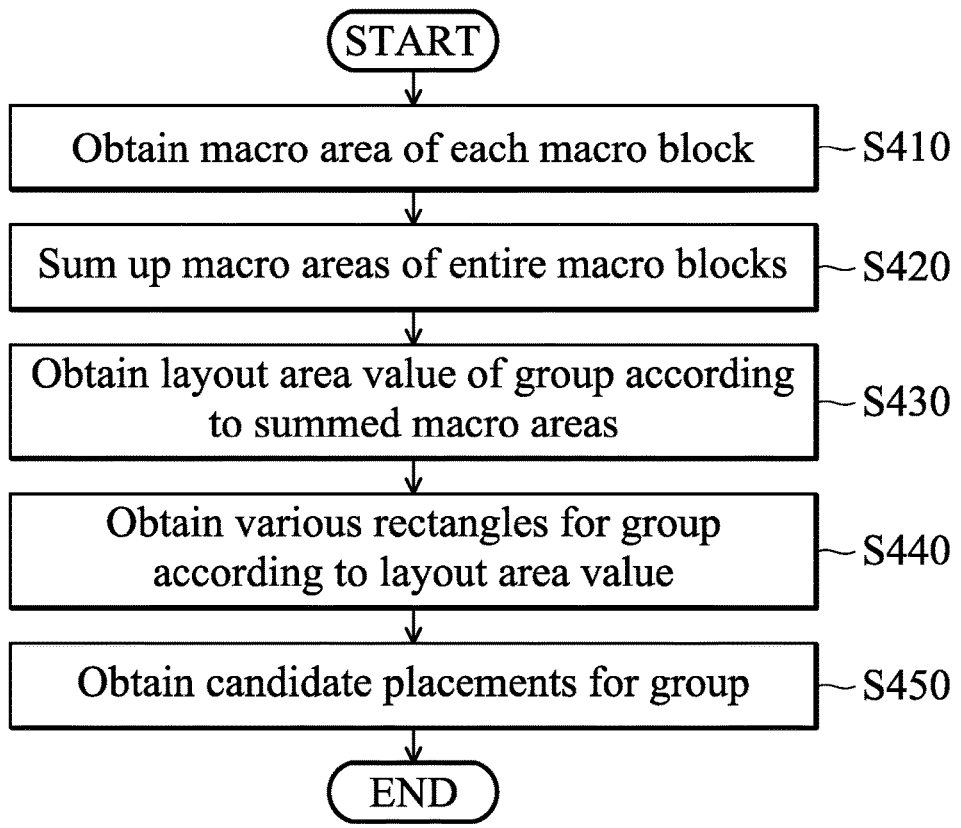
FIG. 4 shows a flowchart of the rectangle optimization procedure for each group MG of step S230 of FIG. 2 according to an embodiment of the invention.

FIG. 4 shows a flowchart of the rectangle optimization procedure for each group MG of step S230 of FIG. 2 according to an embodiment of the invention. First, in step S410, the processor obtains the physical layout of each macro block MB in the group MG and obtains a macro area of each macro block MB according to the physical layout thereof. Next, in step S420, the processor sums up the macro areas of all the macro blocks MB within the group MG Next, in step S430, the processor obtains the value of placement area of the group MG according to the summed macro areas, layout information and constraints, e.g. the routing area estimation of the macro blocks MB, and the pin locations of each macro block MB. In general, the value of placement area of the group MG is larger than the summed macro areas.

Next, in step S440, the processor obtaining a plurality of rectangles for the group MG according to the value of placement area of the group MG It should be noted that the area of each rectangle is equal to the value of placement area. Furthermore, the rectangles have different lengths and different widths. Next, in step S450, the processor places the macro blocks MB of the group MG into each rectangle, and further determine whether each rectangle with all the macro blocks MB is capable of being a candidate placement CP for the group MG For example, if all the macro blocks MB can be completely placed within the rectangle, the processor can determine that the rectangle with all the macro blocks MB is a candidate placement CP for the group MG Simultaneously, the processor dynamically adjusts a plurality of channel widths between the macro blocks MB into each rectangle. In some embodiments, if all the macro blocks MB cannot be completely placed within the rectangle (for example, at least one macro block MB exceeds a boundary of the rectangle), the processor can determine that the rectangle with all the macro blocks MB is not a candidate placement CP for the group MG In some embodiments, if all the macro blocks MB cannot be completely placed within the rectangle, the processor can remove the macro blocks MB exceeding the rectangle from the rectangle, and then the processor can determine that the rectangle with the remaining macro blocks MB is a candidate placement CP for the group MG.

Figure 5A:
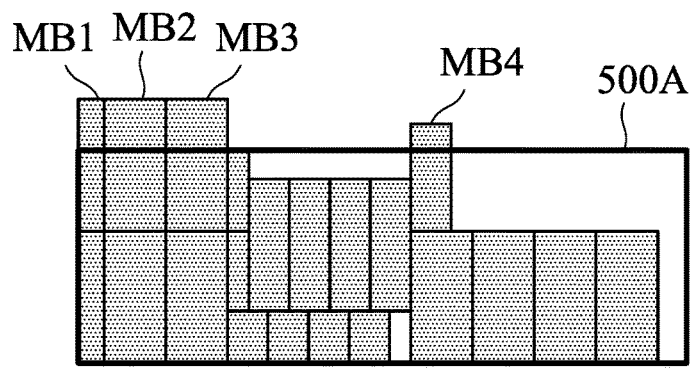
FIGS. 5A-5H show an example illustrating a plurality of rectangles for a group MG comprising a plurality of macro blocks MB.
Figure 5B:
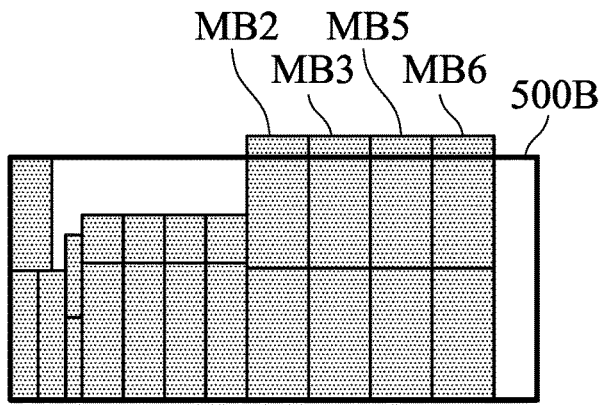
Figure 5C:
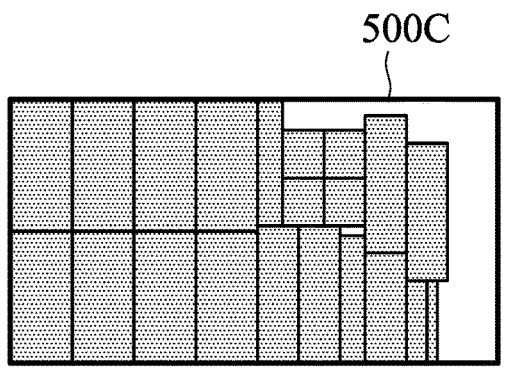
Figure 5D:
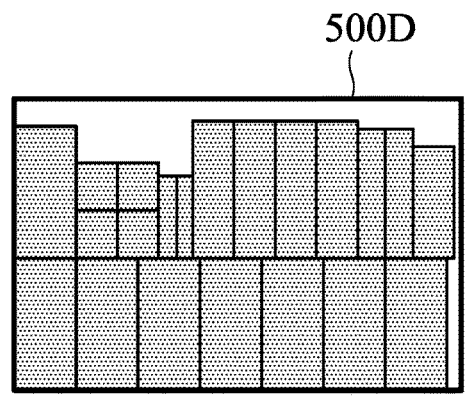
Figure 5E:
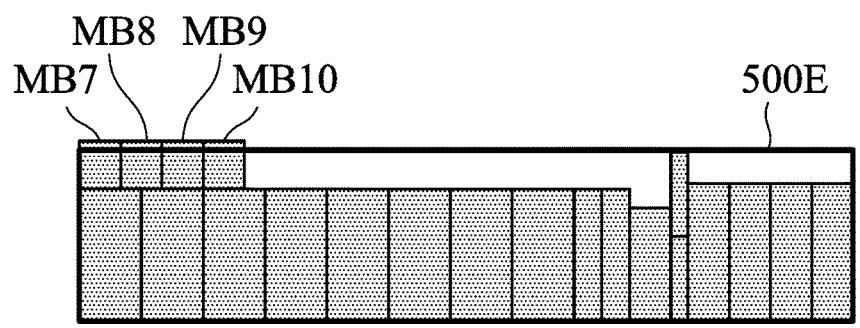
Figure 5F:
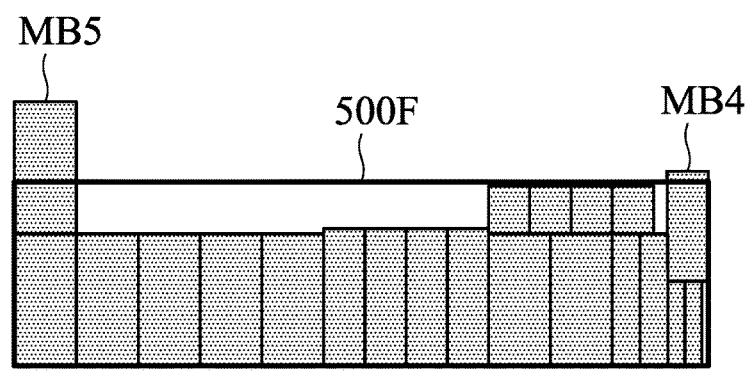
Figure 5G:
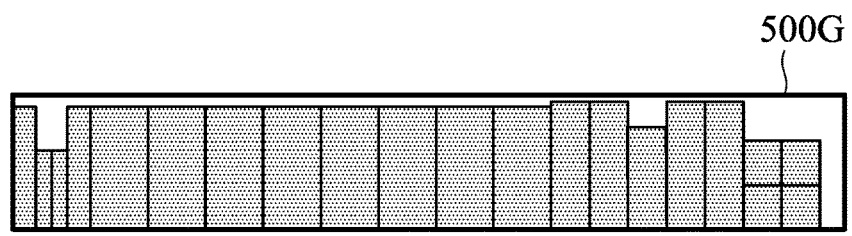
Figure 5H:
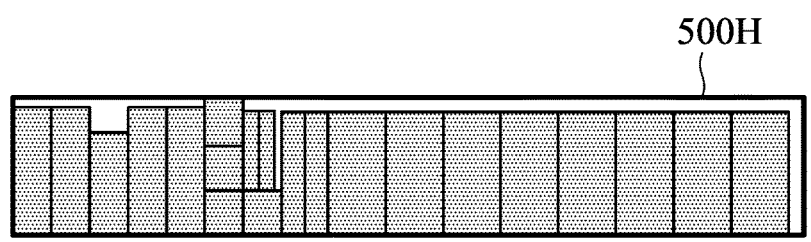

FIGS. 5A-5H show an example illustrating a plurality of rectangles 500A-500H for a group MG comprising a plurality of macro blocks MB. The rectangles 500A-500H are obtained according to a value of placement area of the group MG In the embodiment, area of each rectangle is equal to the value of placement area of the group MG Thus, the areas of the rectangles 500A-500H are the same. Furthermore, the lengths of the rectangles 500A-500H are different, and the widths of the rectangles 500A-500H are also different. In FIG. 5A, the macro blocks MB1-MB4 exceed the rectangle 500A, thus the processor may determine that the rectangle 500A associated with the macro blocks MB is not a candidate placement CP for the group MG Similarly, the macro blocks MB2-MB3 and MB5-MB6 exceed the rectangle 500B of FIG. 5B, the macro blocks MB7-MB10 exceed the rectangle 500E of FIG. 5E, and the macro blocks MB4-MB5 exceed the rectangle 500F of FIG. 5F. Thus, the processor may also determine that the rectangles 500B, 500E and 500F associated with the macro blocks MB are not the candidate placements CP for the group MG On the contrary, the processor may determine that the rectangles 500C, 500D, 500G and 500H associated with the macro blocks MB are the candidate placements CP for the group MG due to there being no macro block MB that exceeds the rectangles 500C, 500D, 500G and 500H.

In some embodiments, the processor may determine that the rectangle 500B, 500E or 500F is the candidate placement CP for the group MG by removing the macro blocks MB exceeding the rectangle. For example, the rectangle 500B can be the candidate placement CP for the group MG after removing the macro blocks MB2, MB3, MB5 and MB6 from the rectangle 500B of FIG. 5B. Furthermore, when the placement of the rectangle 500B is selected from the candidate placements CP of the group MG, the processor can perform the second placement procedure (e.g. S260 of FIG. 2), so aso to place the removed macro blocks MB2, MB3, MB5 and MB6 into the intermediate placement obtained by the first placement procedure (e.g. S240 of FIG. 2).

Figure 6:
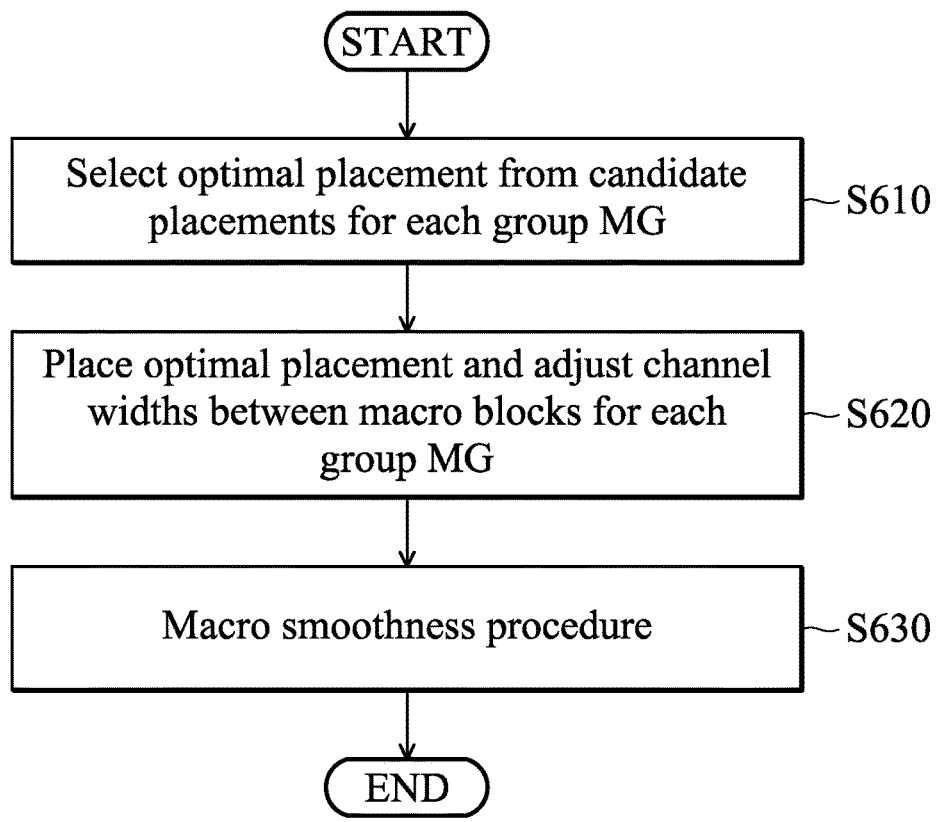
FIG. 6 shows a flowchart of the first placement procedure for the groups MG of step S240 of FIG. 2 according to an embodiment of the invention.

FIG. 6 shows a flowchart of the first placement procedure for the groups MG of step S240 of FIG. 2 according to an embodiment of the invention. First, in step S610, the processor selects an optimal placement from the candidate placements CP for each group MG Next, in step S620, the processor places the optimal placements in the layout area of the IC according to a specific rule, and further adjusts channel widths between macro blocks for each group MG, thereby obtaining a first intermediate placement for the groups MG In the embodiment, the number of the selected optimal placements is equal to the number of the groups MG in the first intermediate placement, i.e. each group MG has an individual selected optimal placement. In some embodiments, the specific rule is determined according to a data flow control for the IC, and information regarding a data flow can be extracted from connections by EDA tools or can be directly input by designers of the IC. Next, in step S630, the processor performs a macro smoothness procedure on the optimal placements in the first intermediate placement, so as to smooth the arrangement of the macro blocks MB and obtain a second intermediate placement for the groups MG Compared with a blank space BS of the first intermediate placement, a blank space BS of the second intermediate placement is a better area in which to place the standard cells and to route the routing paths between the standard cells and the groups MG For example, the height difference of the two adjacent macro blocks MB can be decreased by performing a macro smoothness procedure, wherein the two adjacent macro blocks MB may belong to the same group or different groups. It should be noted that the processor can analyze the blank space BS in the first and second intermediate placements, and determine which intermediate placement is suitable to perform subsequent procedure according to actual applications and various EDA parameters.

Figure 7:
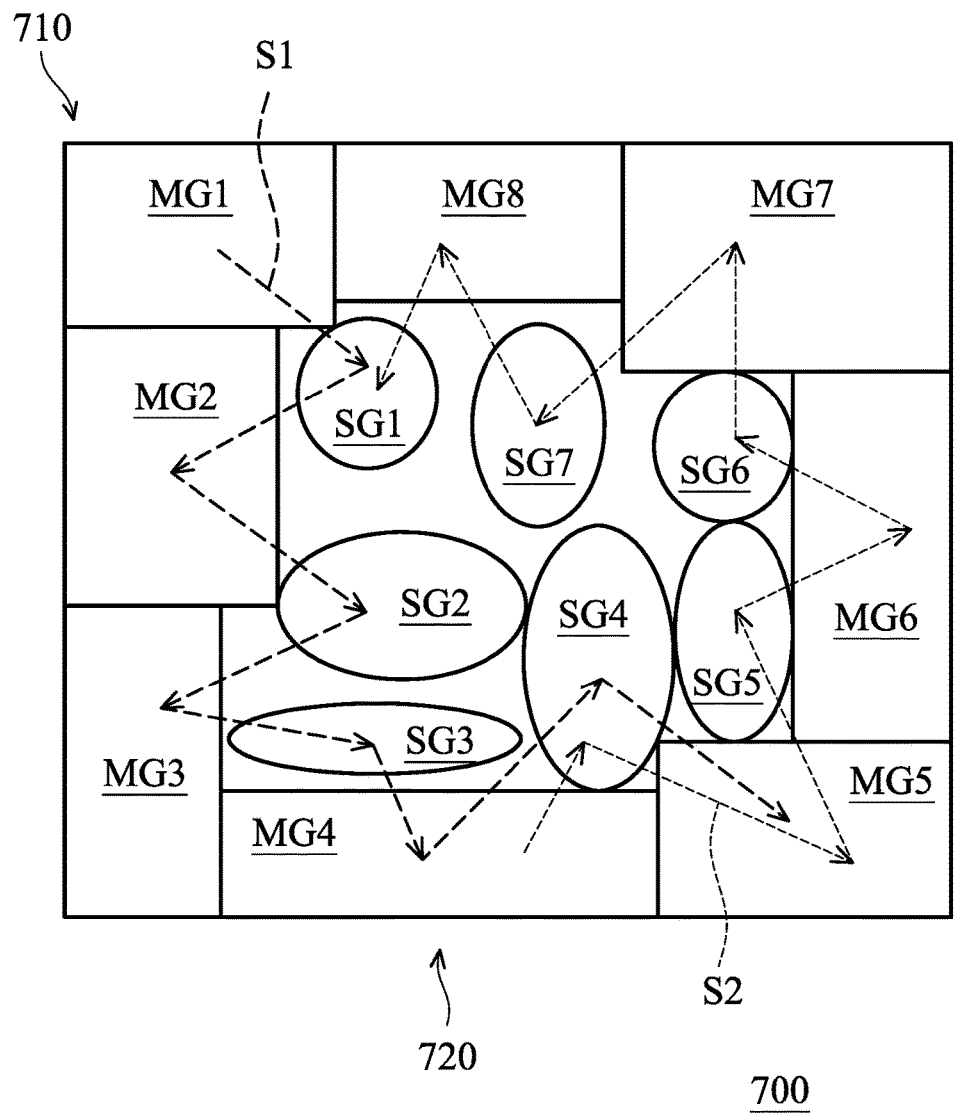
FIG. 7 shows a schematic illustrating a data flow control in an intermediate placement of an IC.
Figure 8A:
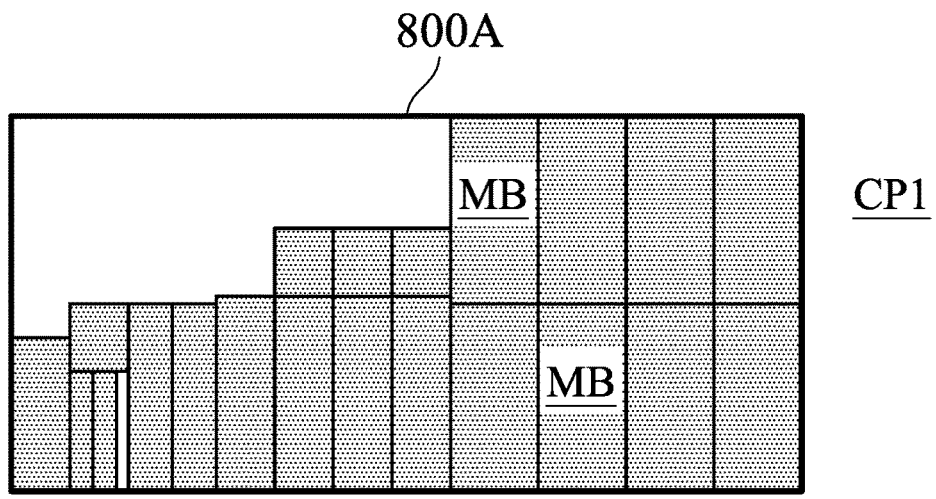
FIGS. 8A-8B show an example illustrating two candidate placements CP1 and CP2 for a group MG comprising a plurality of macro blocks MB.
Figure 8B:
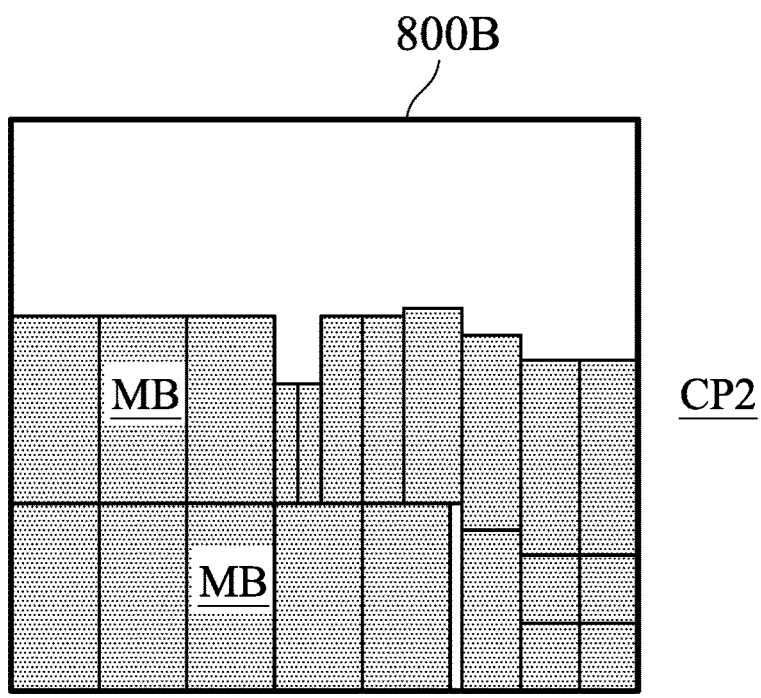
Figure 9A:
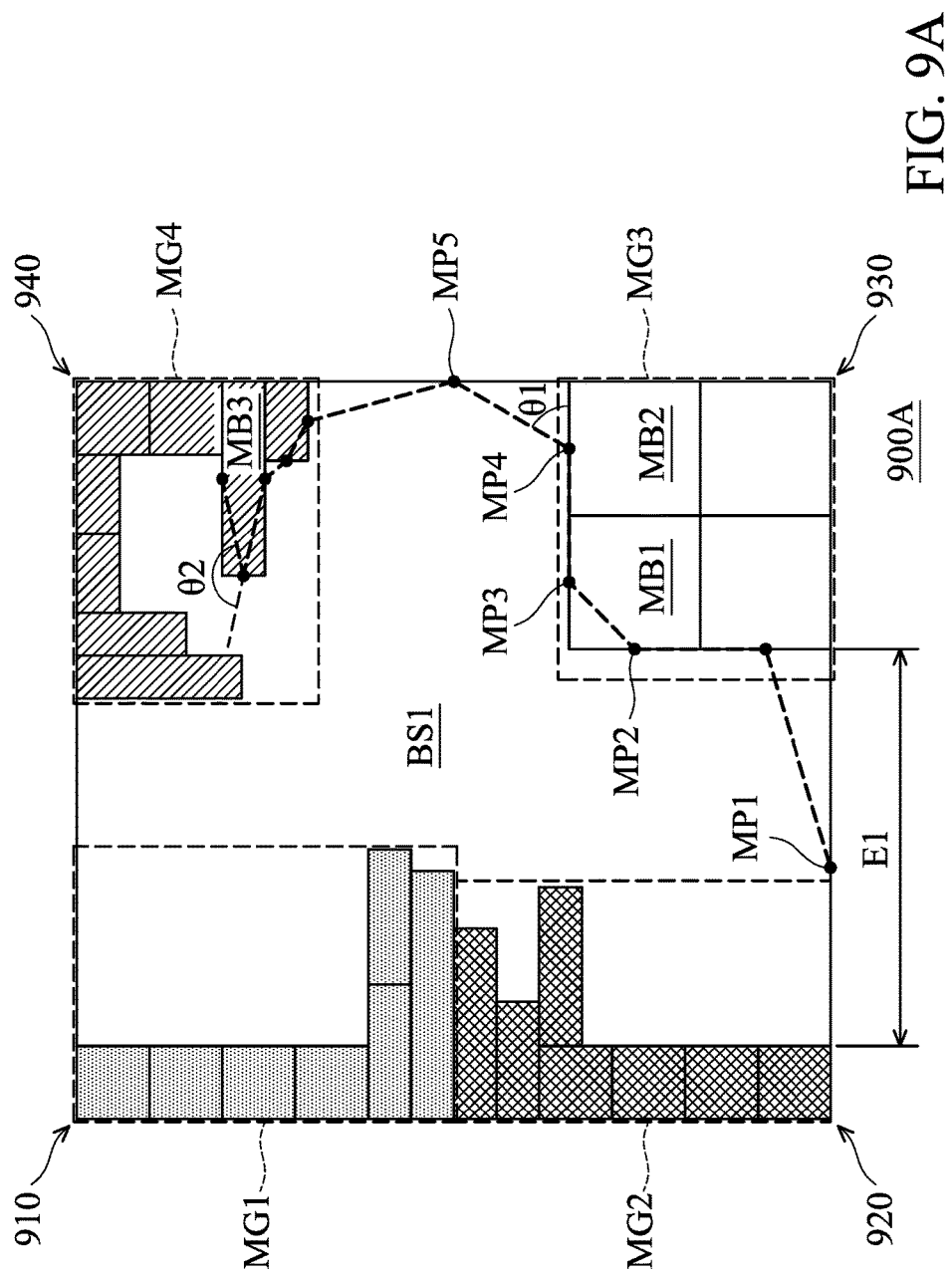
FIG. 9A shows a schematic illustrating an intermediate placement without performing a macro smoothness procedure.

FIG. 7 shows a schematic illustrating a data flow control in an intermediate placement 700 of an IC. As described above, the processor will select an optimal placement from the candidate placements CP for each group MG and places the optimal placements of the groups MG in the layout area of the IC according to the constraints of the data flow control. The intermediate placement 700 comprises a plurality of groups MG1-MG8 and a plurality of standard cell groups SG1-SG 7, wherein each of the groups SG1-SG7 comprises a plurality of standard cells (or gates). In the embodiment, two data flows are considered in the intermediate placement 700, wherein one data is transmitted and processed according to a transmission path S1 and another data is transmitted and processed according to a transmission path S2 in the IC. The transmission path S1 is formed from the group MG1 to the group MG5 through the groups SG1, MG2, SG2, MG3, SG3, MG4 and MG4 in sequence. Furthermore, the transmission path S2 is formed from the group MG4 to the group SG1 through the groups MG4, MG5, SG5, MG6, SG6, MG7, SG7 and MG8 in sequence. Furthermore, the processor can arrange the start and/or end locations of the transmission paths S1 and S2, and the transmission directions of the transmission paths S1 and S2 (e.g. clockwise or anti-clockwise). For example, the processor may place the group MG1 (a start point of the transmission path S1) in a corner 710 of the intermediate placement 700, and then arranges/places the groups MG2-MG5 in an anti-clockwise direction. Simultaneously, the processor may place the group MG4 (a start point of the transmission path S2) at an edge 720 of the intermediate placement 700, and then arranges/places the groups MG5-MG8 in an anti-clockwise direction. According to various constraints in the data flow control, the processor can assign the start/end point location (e.g. a specific corner or edge), the transmission direction (e.g. clockwise or anti-clockwise), and the touch edge (e.g. the edge of the intermediate placement 700 that the transmission path is touched or passed through) of the transmission path, and pin locations of the groups corresponding to the transmission path. In some embodiments, the processor can further consider a routing resource for the transmission paths, such as channel widths between the groups MG, and a routing area on top of the groups MG FIGS. 8A-8B show an example illustrating two candidate placements CP1 and CP2 for a group MG comprising a plurality of macro blocks MB. Referring to FIG. 8A and FIG. 8B together, the rectangles 800A and 800B are obtained according to the value of placement area of the group MG As described above, area of each rectangle is equal to the value of placement area of the group MG Thus, the areas of the rectangles 800A-800B are the same. Furthermore, the lengths of the rectangles 800A-800B are different, and the widths of the rectangles 800A-800B are also different. If the constraint of a data flow control indicates that the group MG should be placed in a specific corner of an intermediate placement, the processor will select the candidate placement CP1 of FIG. 8A as an optimal placement for the group MG Conversely, if the constraint of the data flow control indicates that the group MG should be placed at a specific edge of the intermediate placement, the processor will select the candidate placement CP2 of FIG. 8B as an optimal placement for the group MG FIG. 9A shows a schematic illustrating an intermediate placement 900A without performing a macro smoothness procedure. The intermediate placement 900A comprises a plurality of groups MG1-MG4, and each of the groups MG1-MG4 comprises a plurality of macro blocks MB. In the embodiment, the processor places the optimal candidate placements of the groups MG1-MG4 at four different corners 910-940 in the intermediate placement 900A. According to the candidate placements of the groups MG1-MG4, the processor can calculate a smoothness (SM) value for the macro blocks MB. In the embodiment, the processor will obtain the midpoint of at least one side of each macro block MB, and the midpoint of an edge of the intermediate placement 900A where no macro block is placed. For example, the bottom edge E1 of the intermediate placement 900A has a midpoint MP1. Furthermore, the left side of the macro block MB1 has a midpoint MP2, and the top side of the macro block MB1 has a midpoint MP3. In the embodiment, three neighboring midpoints can obtain an included angle θ. According to all the included angles θ in the intermediate placement 900A, the processor can obtain the macro smoothness value SM according to the following formula (1):

$$SM = \sum -|\vec{L1}||\vec{L2}|\tan\frac{\theta}{2}, \quad (1)$$

where L1 represents the length of a first line between the first and second midpoints of three neighboring midpoints, L2 represents the length of a second line between the second and third midpoints of three neighboring midpoints, and θ represents the included angle between an extending part of the first line and the second line. For example, θ1 represents an included angle between an extending part of a first line formed by the midpoints MP3-MP4 and a second line formed by the midpoints MP4-MP5. Ideally, the absolute value of SM is as small as possible, and the included angle θ should be small. In the intermediate placement 900A, the macro block MB3 of the group MG4 has an included angle θ2 of over 90 degrees. Thus, the height difference between the macro block MB3 and the adjacent macro block is large, and therefore it is difficult to rout around the macro block MB3, i.e. it is hard to perform a routing procedure in a blank space BS1 of the intermediate placement 900A.

Figure 9B:
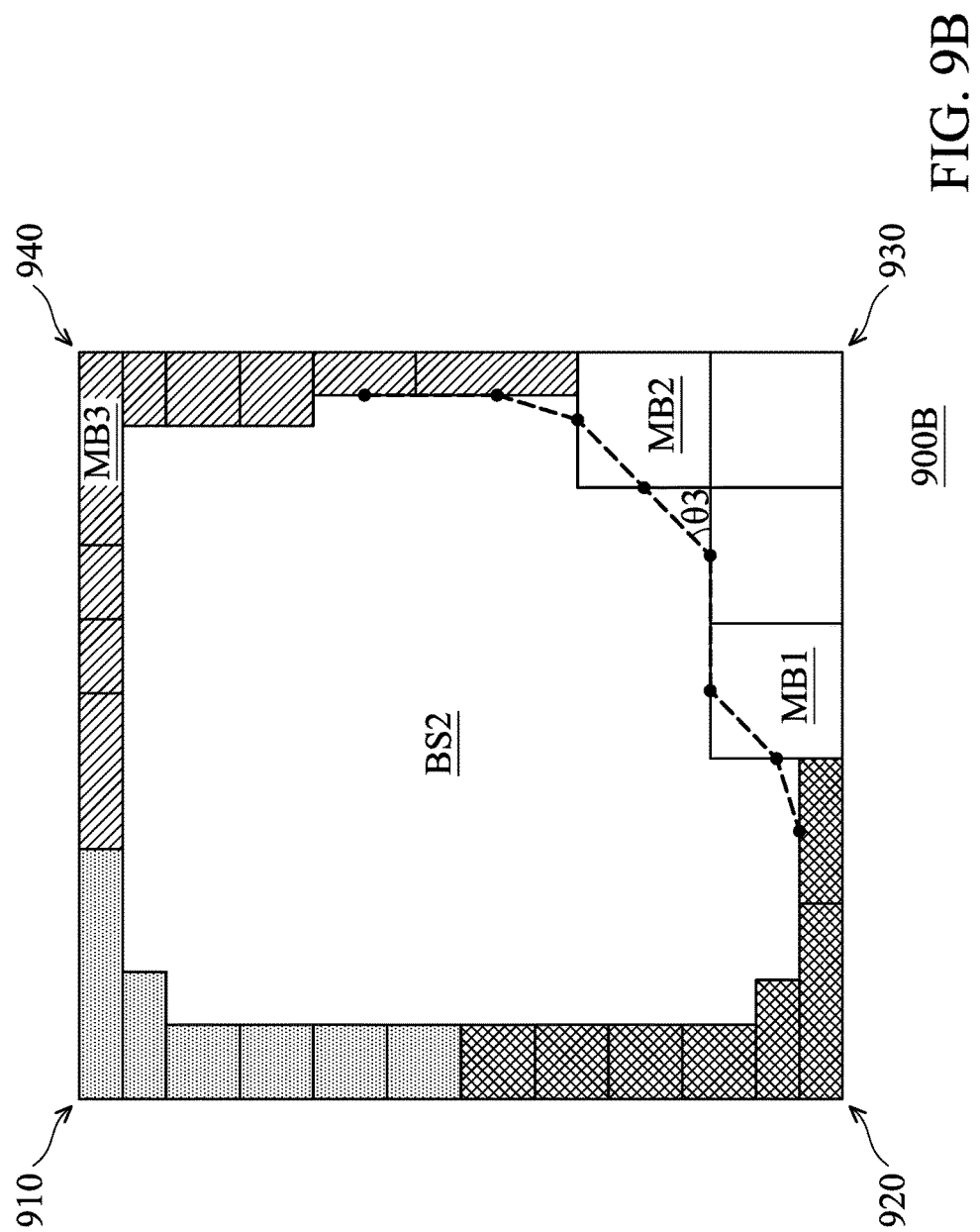
FIG. 9B shows a schematic illustrating an intermediate placement by performing a macro smoothness procedure (step S630 of FIG. 6) on the intermediate placement of FIG. 9A.

FIG. 9B shows a schematic illustrating an intermediate placement 900B by performing a macro smoothness procedure (step S630 of FIG. 6) on the intermediate placement 900A of FIG. 9A. In the intermediate placement 900B, no included angle θ exceeds 90 degrees. Thus, the height difference between two adjacent macro blocks is small. Therefore, it is easy to perform a routing procedure in a blank space BS2 of the intermediate placement 900B by the processor. It should be noted that the rectangles of the groups MG1-MG4 will be modified by the processor and the area of the modified rectangle is changed. Furthermore, if the rectangle is not modified, some macro blocks may be moved outside the rectangle. In some embodiments, the moved macro blocks will be placed in the second placement procedure (S260 of FIG. 2).

Figure 10:
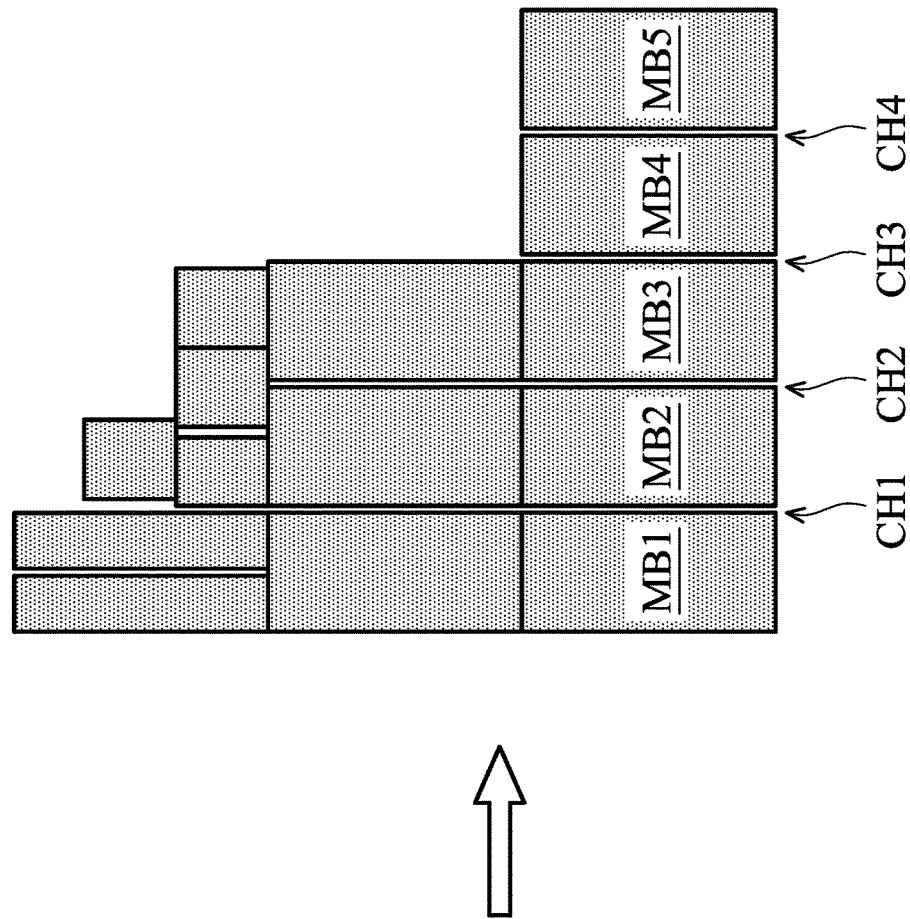
FIG. 10 shows a schematic illustrating an adjustment in the channel widths between the macro blocks MB.
Figure 10:
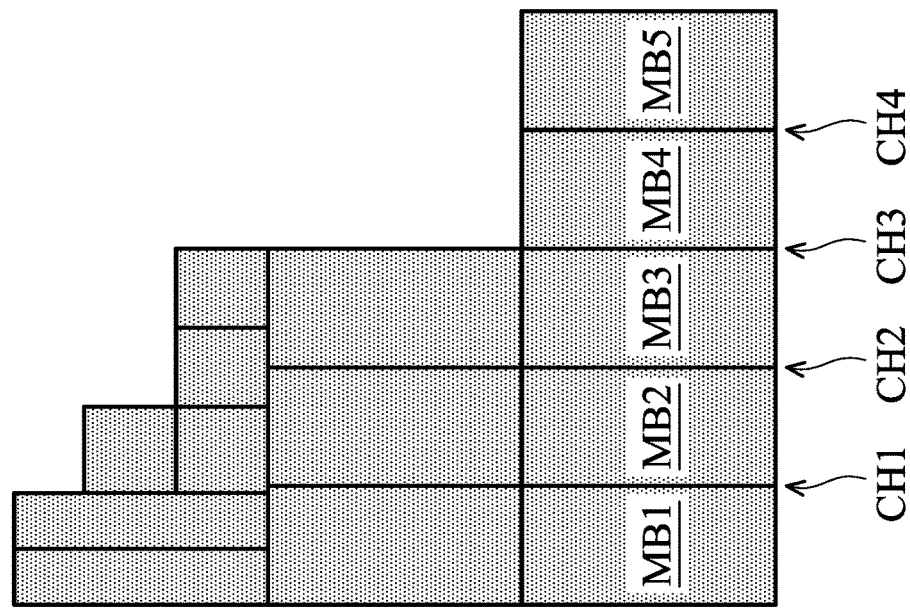

FIG. 10 shows a schematic illustrating an adjustment in the channel widths between the macro blocks MB. As described above, the channel widths can be adjusted in step S620 of FIG. 6 or step S450 of FIG. 4. In FIG. 10, a channel width CH1 represents a routing area between the macro blocks MB1 and MB2, a channel width CH2 represents a routing area between the macro blocks MB2 and MB3, a channel width CH3 represents a routing area between the macro blocks MB3 and MB4, and a channel width CH4 represents a routing area between the macro blocks MB4 and MB5. After adjusting the channel widths between the macro blocks MB, the channel widths CH1-CH4 are increased, and it is easy to perform a routing procedure in the routing areas for the processor.

Figure 11:
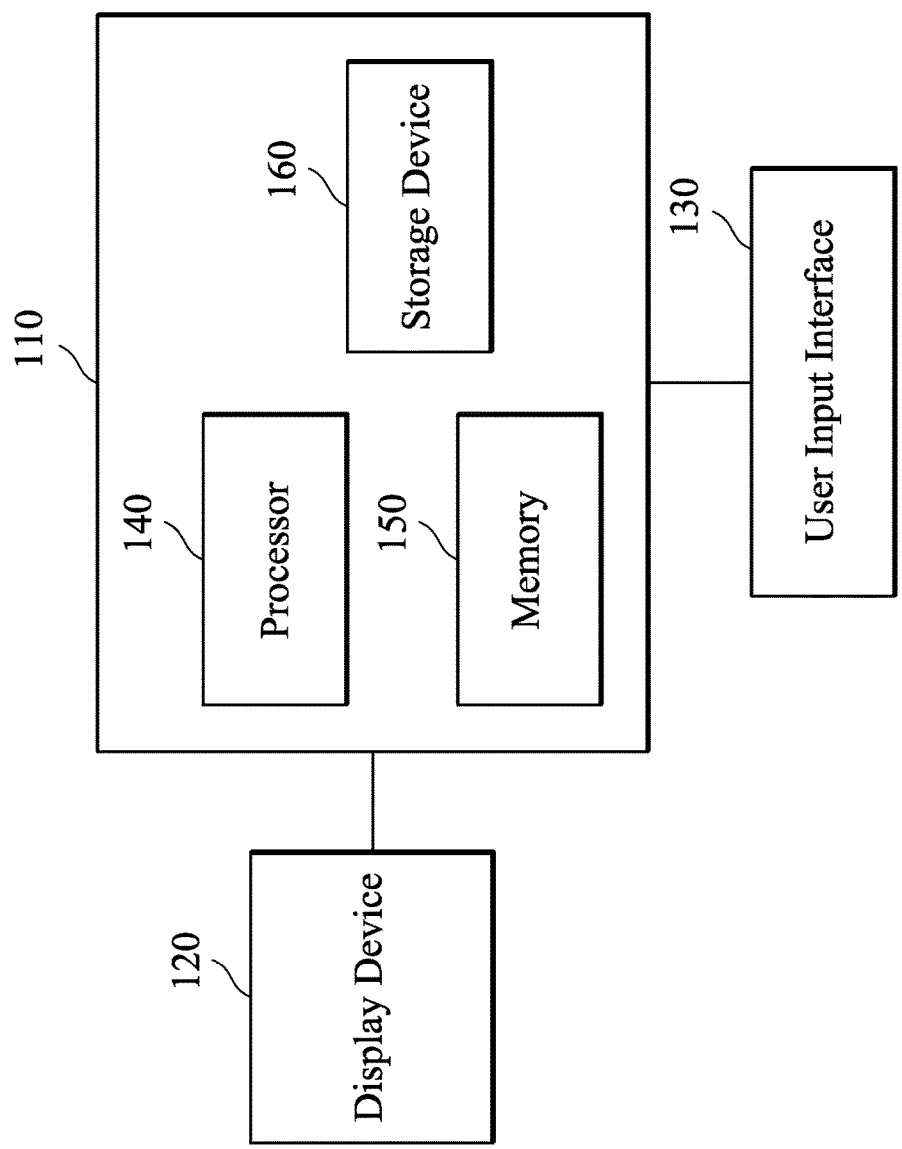
FIG. 11 shows a computer system according to an embodiment of the invention.

FIG. 11 shows a computer system 100 according to an embodiment of the invention. The computer system 100 comprises a computer 110, a display device 120 and a user input interface 130, wherein the computer 110 comprises a processor 140, a memory 150, and a storage device 160. The computer 110 is coupled to the display device 120 and the user input interface 130, wherein the computer 110 is capable of operating an electronic design automation (EDA) tool. Furthermore, the computer 110 is capable of receiving input instruction from the user input interface 130 and displaying the physical layouts and the placements of macro blocks of the IC on the display device 120. In one embodiment, the display device 120 is a GUI for the computer 110. Furthermore, the display device 120 and the user input interface 130 can be implemented in the computer 110. The user input interface 130 may be a keyboard, a mouse and so on. In the computer 110, the storage device 160 can store the operating systems (OSs), applications, and data that comprise input required by the applications and/or output generated by applications. The processor 140 of the computer 110 can perform one or more operations (either automatically or with user input) in any method that is implicitly or explicitly described in this disclosure. For example, during an operation, the processor 140 can load the applications of the storage device 160 into the memory 150, and then the applications can be used by the user to create, view, and/or edit a placement, a floor plan and a physical layout for a circuit design.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for providing a macro placement of an integrated circuit, comprising:
   obtaining an initial placement of the integrated circuit, wherein the initial placement comprises a plurality of first macro blocks;
   dividing the first macro blocks into a plurality of groups according to a hierarchy of the integrated circuit;
   obtaining a value of placement area for each of the groups according to macro areas of the first macro blocks;
   obtaining a plurality of candidate placements for each of the groups according to the value of placement area corresponding to the group, wherein the candidate placement comprises the first macro blocks corresponding to the group;
   obtaining a first macro placement according to a specific placement selecting from the candidate placements for each of the groups; and
   fabricating the integrated circuit based on a layout of the integrated circuit corresponding to the first macro placement,
   wherein the step of obtaining the candidate placements for each of the groups according to the value of placement area corresponding to the group further comprises:
   obtaining a plurality of rectangles according to the value of placement area corresponding to the group, wherein an area value of each of the rectangles is equal to the value of placement area, and the rectangles have different lengths and widths; and
   placing the first macro blocks corresponding to the group into the rectangle for each of the rectangles,
   wherein the candidate placement is the rectangle associated with the first macro blocks completely placed within the rectangle.

2. The method as claimed in claim 1, further comprising:
   obtaining a second macro placement according to a plurality of second macro blocks of the integrated circuit and the specific placements,
   wherein the second macro block is a macro block that is not divided into the groups, or the first macro block that is not placed in the specific placement of the corresponding group.

3. The method as claimed in claim 1, wherein the step of obtaining the value of placement area for each of the groups according to macro areas of the first macro blocks further comprises:
   obtaining the macro area of each of the first macro block of the group;
   summing the macro areas of the first macro blocks within the group; and
   obtaining the value of placement area according to the summed macro areas of the first macro blocks of the group.

4. The method as claimed in claim 1, wherein the step of obtaining the first macro placement according to the specific placement selecting from the candidate placements for each of the groups further comprises:
   obtaining a first intermediate placement according to the specific placements; and
   performing a macro smoothness procedure on the first intermediate placement, to obtain a second intermediate placement,
   wherein a first height difference of the two adjacent first macro blocks in the second intermediate placement is smaller than a second height difference of the two adjacent first macro blocks in the first intermediate placement.

5. The method as claimed in claim 1, further comprising:
   adjusting channel widths between the first macro blocks in the specific placement for each of the groups.

6. The method as claimed in claim 1, wherein the step of obtaining the first macro placement according to the specific placement selecting from the candidate placements for each of the groups further comprises:
   placing the specific placements of the groups around a layout area of the integrated circuit according to a data flow, to provide the first macro placement.

7. The method as claimed in claim 6, wherein the step of obtaining the first macro placement according to the specific placement selecting from the candidate placements for each of the groups further comprises:
   placing the first macro blocks of the groups in the first macro placement according to pin locations of at least one of the groups.

8. The method as claimed in claim 7, wherein the step of obtaining the candidate placements for each of the groups according to the value of placement area corresponding to the group further comprises:
   removing at least one of the first macro blocks from the rectangle, wherein the one of the first macro blocks exceeds the rectangle.

9. The method as claimed in claim 1, further comprising:
   placing a plurality of standard cells of the integrated circuit in a blank space of the first macro placement, to provide the layout of the integrated circuit.

10. A method for providing a macro placement of an integrated circuit, comprising:
    obtaining an initial placement of the integrated circuit, wherein the initial placement comprises a plurality of first macro blocks;
    dividing the first macro blocks into a plurality of groups according to a hierarchy of the integrated circuit;

obtaining a value of placement area for each of the groups according to macro areas of the first macro blocks;

obtaining a plurality of candidate placements for each of the groups according to the value of placement area corresponding to the group, wherein the candidate placement comprises the first macro blocks corresponding to the group, and each of the candidate placements comprises a rectangle having an individual length and an individual width;

selecting a specific placement from the candidate placements for each of the groups, and adjusting channel widths between the first macro blocks in the specific placements;

obtaining a first macro placement according to the specific placements; and fabricating the integrated circuit based on a layout of the integrated circuit corresponding to the first macro placement, wherein the step of obtaining the candidate placements for each of the groups according to the value of placement area corresponding to the group further comprises:

obtaining the rectangles according to the value of placement area corresponding to the group, wherein an area of each of the rectangles is equal to the value of placement area; and placing the first macro blocks corresponding to the group into the rectangle for each of the rectangles, wherein the candidate placement is the rectangle associated with the first macro blocks completely placed within the rectangle.

11. The method as claimed in claim 10, further comprising:

obtaining a second macro placement according to a plurality of second macro blocks of the integrated circuit and the specific placements, wherein the second macro block is a macro block that is not divided into the groups, or the first macro block that is not placed in the specific placement of the corresponding group.

12. The method as claimed in claim 10, wherein the step of obtaining the value of placement area for each of the groups according to macro areas of the first macro blocks further comprises:

obtaining the macro area of each of the first macro block of the group;

summing the macro areas of the first macro blocks within the group; and obtaining the value of placement area according to the summed macro areas of the first macro blocks of the group.

13. The method as claimed in claim 10, wherein the step of obtaining the first macro placement according to the specific placements further comprises:

performing a macro smoothness procedure on the first macro placement according to a specific rule, so as to decrease a height difference of the two adjacent first macro blocks in the first macro placement.

14. The method as claimed in claim 10, wherein the step of obtaining the first macro placement according to the specific placements further comprises:

placing the specific placements of the groups around the layout area of the integrated circuit according to a data flow, to provide a intermediate placement; and placing the first macro blocks of the groups in the intermediate placement according to pin locations of at least one of the groups wherein the first macro placement is obtained according to the intermediate placement.

15. The method as claimed in claim 10, further comprising:

placing a plurality of standard cells of the integrated circuit in a blank space of the first macro placement, to provide a layout of the integrated circuit.

16. A non-transitory computer-readable storage medium storing instructions that, when executed by a computer, cause the computer to perform a method for providing a macro placement of an integrated circuit, the method comprising:

obtaining an initial placement of the integrated circuit, wherein the initial placement comprises a plurality of first macro blocks;

dividing the first macro blocks into a plurality of groups according to a hierarchy of the integrated circuit;

obtaining a value of placement area for each of the groups according to macro areas of the first macro blocks;

obtaining a plurality of candidate placements for each of the groups according to the value of placement area corresponding to the group, wherein the candidate placement comprises the first macro blocks corresponding to the group;

obtaining a first macro placement according to a specific placement selecting from the candidate placements for each of the groups; and fabricating the integrated circuit based on a layout of the integrated circuit corresponding to the first macro placement, wherein the step of obtaining the candidate placements for each of the groups according to the value of placement area corresponding to the group further comprises:

obtaining a plurality of rectangles according to the value of placement area corresponding to the group, wherein an area value of each of the rectangles is equal to the value of placement area, and the rectangles have different lengths and widths; and placing the first macro blocks corresponding to the group into the rectangle for each of the rectangles, wherein the candidate placement is the rectangle associated with the first macro blocks completely placed within the rectangle.

17. The non-transitory computer-readable storage medium of claim 16, wherein the method further comprises:

obtaining a second macro placement according to a plurality of second macro blocks of the integrated circuit and the specific placements, wherein the second macro block is a macro block that is not divided into the groups, or the first macro block that is not placed in the specific placement of the corresponding group.

18. The non-transitory computer-readable storage medium of claim 16, wherein the step of obtaining the value of placement area for each of the groups according to macro areas of the first macro blocks further comprises:

obtaining the macro area of each of the first macro block of the group;

summing the macro areas of the first macro blocks within the group; and obtaining the value of placement area according to the summed macro areas of the first macro blocks of the group.

19. The non-transitory computer-readable storage medium of claim 16, wherein the step of obtaining the first macro placement according to the specific placement selecting from the candidate placements for each of the groups further comprises:
- obtaining a first intermediate placement according to the specific placements; and
- performing a macro smoothness procedure on the first intermediate placement, to obtain a second intermediate placement,
- wherein a first height difference of the two adjacent first macro blocks in the second intermediate placement is smaller than a second height difference of the two adjacent first macro blocks in the first intermediate placement.

20. The non-transitory computer-readable storage medium of claim 16, wherein the step of obtaining the first macro placement according to the specific placement selecting from the candidate placements for each of the groups further comprises:
- placing the specific placements of the groups around a layout area of the integrated circuit according to a data flow, to provide the first macro placement;
- placing the first macro blocks of the groups in the first macro placement according to pin locations of at least one of the groups.

* * * * *